United States Patent
Hsu

(10) Patent No.: US 10,520,988 B2
(45) Date of Patent: Dec. 31, 2019

(54) BENDABLE DISPLAY APPARATUS AND SUPPORTING DEVICE

(71) Applicant: FOSITEK CORPORATION, New Taipei (TW)

(72) Inventor: An-Szu Hsu, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 181 days.

(21) Appl. No.: 15/864,757

(22) Filed: Jan. 8, 2018

(65) Prior Publication Data

US 2019/0112852 A1    Apr. 18, 2019

(30) Foreign Application Priority Data

Oct. 13, 2017 (TW) .............................. 106135128 A

(51) Int. Cl.
*G06F 1/16* (2006.01)
*E05D 3/12* (2006.01)
*E05D 11/10* (2006.01)

(52) U.S. Cl.
CPC ............. *G06F 1/1681* (2013.01); *E05D 3/12* (2013.01); *E05D 11/105* (2013.01); *G06F 1/1641* (2013.01); *G06F 1/1652* (2013.01); *E05D 3/122* (2013.01); *E05Y 2900/606* (2013.01); *Y10T 16/547* (2015.01)

(58) Field of Classification Search
CPC ...... F16C 11/04; G06F 1/1681; G06F 1/1641; G06F 1/1652; Y10T 16/547; E05D 3/12; E05D 11/105

See application file for complete search history.

(56) References Cited

U.S. PATENT DOCUMENTS

| | | | | |
|---|---|---|---|---|
| 5,493,760 A * | 2/1996 | Takimoto | .................. | E05D 3/12 16/366 |
| 5,659,929 A * | 8/1997 | Cheng | ....................... | E05D 3/12 16/366 |
| 7,159,279 B2 * | 1/2007 | Liu | ........................... | E05D 3/10 16/327 |
| 9,185,815 B2 * | 11/2015 | Hsu | ...................... | H05K 5/0226 |
| 9,265,166 B2 * | 2/2016 | Hsu | ...................... | H05K 5/0226 |

(Continued)

*Primary Examiner* — Jeffrey O'Brien
(74) *Attorney, Agent, or Firm* — Li & Cai Intellectual Property (USA) Office

(57) ABSTRACT

A bendable display apparatus includes two supporting devices and a bendable display mounted on the two supporting devices. Each supporting device includes a dual-shaft driving module and two buffering modules respectively arranged at two opposite outer sides of the dual-shaft driving module. The dual-shaft driving module includes two shafts parallel to each other and a synchronizing member sandwiched between the two shafts. Each buffering module includes an internal connecting member fixed on the synchronizing member, an external connecting member slidably disposed on the internal connecting member, and a linkage mechanism configured to be driven by the synchronizing shaft for moving the external connecting member relative to the internal connecting member. When the dual-shaft driving modules are rotated, the bendable display is bent while a length of the bendable display remains constant, and each external connecting member is moved relative to the corresponding internal connecting member.

18 Claims, 13 Drawing Sheets

(56) References Cited

U.S. PATENT DOCUMENTS

| | | | |
|---|---|---|---|
| 9,265,167 B2* | 2/2016 | Hsu | H04M 1/022 |
| 9,274,566 B1* | 3/2016 | Horng | G06F 1/1681 |
| 10,070,546 B1* | 9/2018 | Hsu | H04M 1/0216 |
| 2015/0160695 A1* | 6/2015 | Su | G06F 1/1618 |
| | | | 16/366 |
| 2015/0245510 A1* | 8/2015 | Hsu | H05K 5/0226 |
| | | | 16/250 |

* cited by examiner

BENDABLE DISPLAY APPARATUS AND SUPPORTING DEVICE

BACKGROUND OF THE INVENTION

1. Field of the Invention

The present disclosure relates to a display apparatus; in particular, to a bendable display apparatus and a supporting device.

2. Description of Related Art

When a conventional supporting device is outwardly bent, the total length of the hinge module of the conventional supporting device is not changed, and a plate mounted on an outer surface of the conventional supporting device is deformed because the hinge module stretches the plate. That is to say, when a bendable display mounted on the outer surface of the conventional supporting device is outwardly bent, the bendable display is easily broken because the hinge module of the conventional supporting device stretches the bendable display.

SUMMARY OF THE INVENTION

The present disclosure provides a bendable display apparatus and a supporting device to effectively overcome the drawbacks associated with conventional supporting devices.

The present disclosure discloses a bendable display apparatus, which includes two supporting devices and a bendable display mounted on the two supporting devices. Each of the two supporting devices includes a dual-shaft driving module and two buffering modules. The dual-shaft driving module includes two shafts and a synchronizing member. The two shafts are substantially parallel to each other. Each of the two shafts has a spiral groove recessed on an outer surface thereof and has a spiral angle within a range of 40 degrees to 60 degrees. The synchronizing member includes a synchronizing block sandwiched between the two shafts and a synchronizing shaft connected to the synchronizing block. The synchronizing block includes two driving portions respectively protruding from two opposite side surfaces thereof and respectively coupling with the spiral grooves of the two shafts. When one of the two shafts is spun to transmit a force to the synchronizing block, the synchronizing block rotates the other shaft at the same time by the force. The two buffering modules are respectively arranged at two opposite outer sides of the dual-shaft hinge module and are respectively installed to the two shafts. Each of the two buffering modules includes an internal connecting member fixed on the corresponding shaft, an external connecting member slidably disposed on the internal connecting member, and a linkage mechanism pivotally connecting to the internal connecting member. The linkage mechanism is configured to be driven by the synchronizing shaft for moving the external connecting member relative to the internal connecting member. In each of the two supporting devices, the dual-shaft driving module is bendable between an unfolded position and an outwardly folded position. When the dual-shaft driving module is at the unfolded position, the supporting device is a flat structure. When the dual-shaft driving module is at the outwardly folded position, the supporting device is a curved structure and the internal members of the two buffering modules are arranged inside the supporting device. When the dual-shaft driving module of each of the two supporting devices is rotated from the unfolded position to the outwardly folded position, the bendable display is bent while a length of the bendable display remains constant, and the external connecting member of each of the buffering modules is moved toward the corresponding synchronizing member with respect to the internal connecting member.

The present disclosure also discloses a supporting device, which includes a dual-shaft driving module and two buffering modules. The dual-shaft driving module includes two shafts and a synchronizing member. The two shafts are substantially parallel to each other. Each of the two shafts has a spiral groove recessed on an outer surface thereof and has a spiral angle within a range of 40 degrees to 60 degrees. The synchronizing member includes a synchronizing block sandwiched between the two shafts and a synchronizing shaft connected to the synchronizing block. The synchronizing block includes two driving portions respectively protruding from two opposite side surfaces thereof and respectively coupling with the spiral grooves of the two shafts. When one of the two shafts is spun to transmit a force to the synchronizing block, the synchronizing block rotates the other shaft at the same time by the force. The two buffering modules are respectively arranged at two opposite outer sides of the dual-shaft hinge module and are respectively installed to the two shafts. Each of the two buffering modules includes an internal connecting member fixed on the corresponding shaft, an external connecting member slidably disposed on the internal connecting member, and a linkage mechanism pivotally connecting to the internal connecting member. The linkage mechanism is configured to be driven by the synchronizing shaft for moving the external connecting member relative to the internal connecting member. The dual-shaft driving module is bendable between an unfolded position and an outwardly folded position. When the dual-shaft driving module is bent from the unfolded position toward the outwardly folded position, the supporting device is changed from a flat structure to a curved structure, the internal members of the two buffering modules are arranged inside the supporting device, and the external connecting member of each of the two buffering modules is moved toward the synchronizing member with respect to the corresponding internal connecting member.

In summary, for the bendable display apparatus of the present disclosure, when the dual-shaft driving module is bent between the unfolded position and the outwardly folded position, the external connecting member is moved relative to the internal connecting member, so that the supporting device does not stretch the bendable display. Thus, when the supporting device is applied to support the bendable display, the bendable display can be bent without suffering damage.

In order to further appreciate the characteristics and technical contents of the present disclosure, references are hereunder made to the detailed descriptions and appended drawings in connection with the present disclosure. However, the appended drawings are merely shown for exemplary purposes, and should not be construed as restricting the scope of the present disclosure.

DETAILED DESCRIPTION OF THE PREFERRED EMBODIMENTS

Reference is made to FIGS. 1 to 15, which illustrate the present disclosure. References are hereunder made to the detailed descriptions and appended drawings in connection with the present disclosure. However, the appended drawings are merely provided for exemplary purposes, and should not be construed as restricting the scope of the present disclosure.

Figure 1:
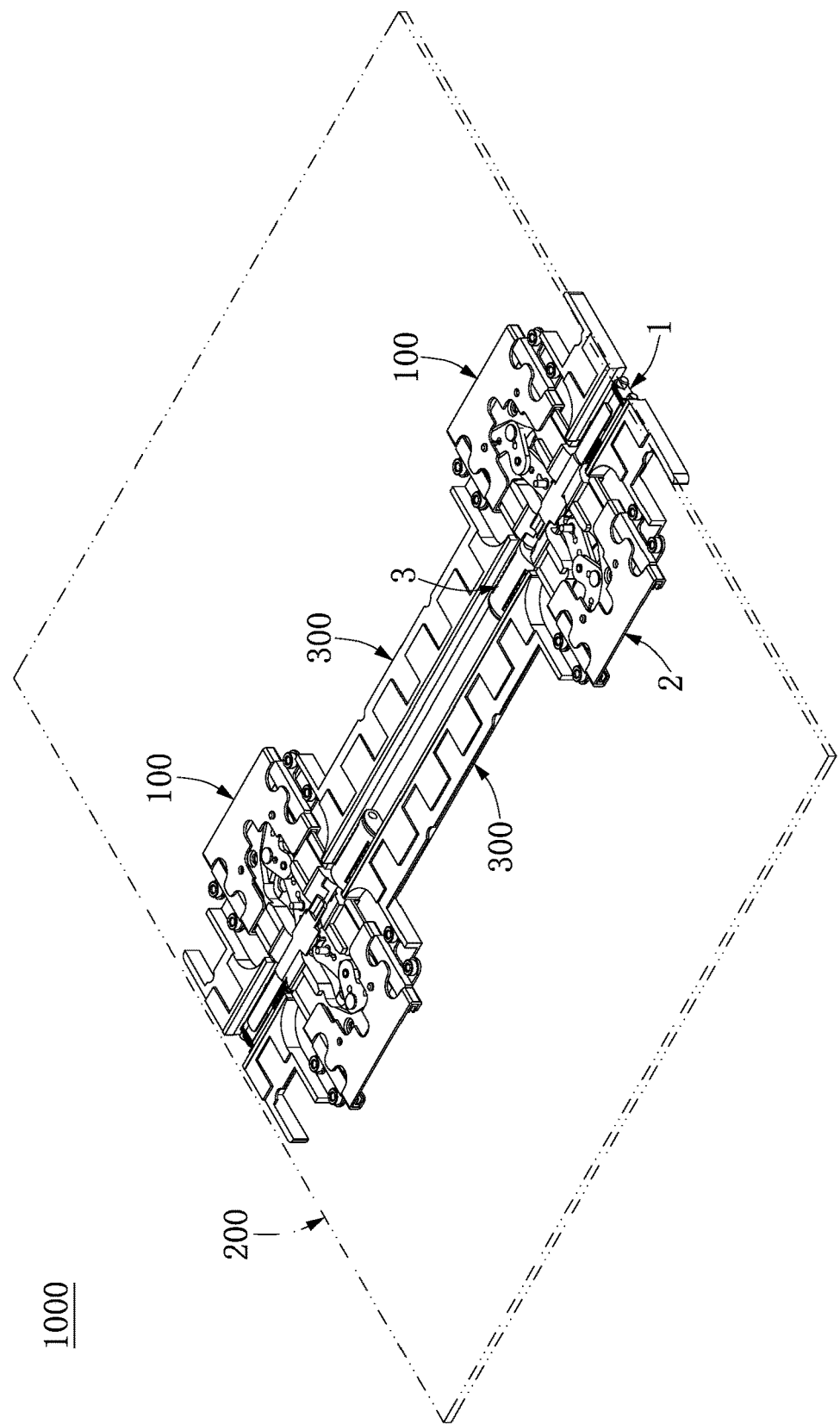
FIG. 1 is a perspective view showing a bendable display apparatus according to an embodiment of the present disclosure.
Figure 2:
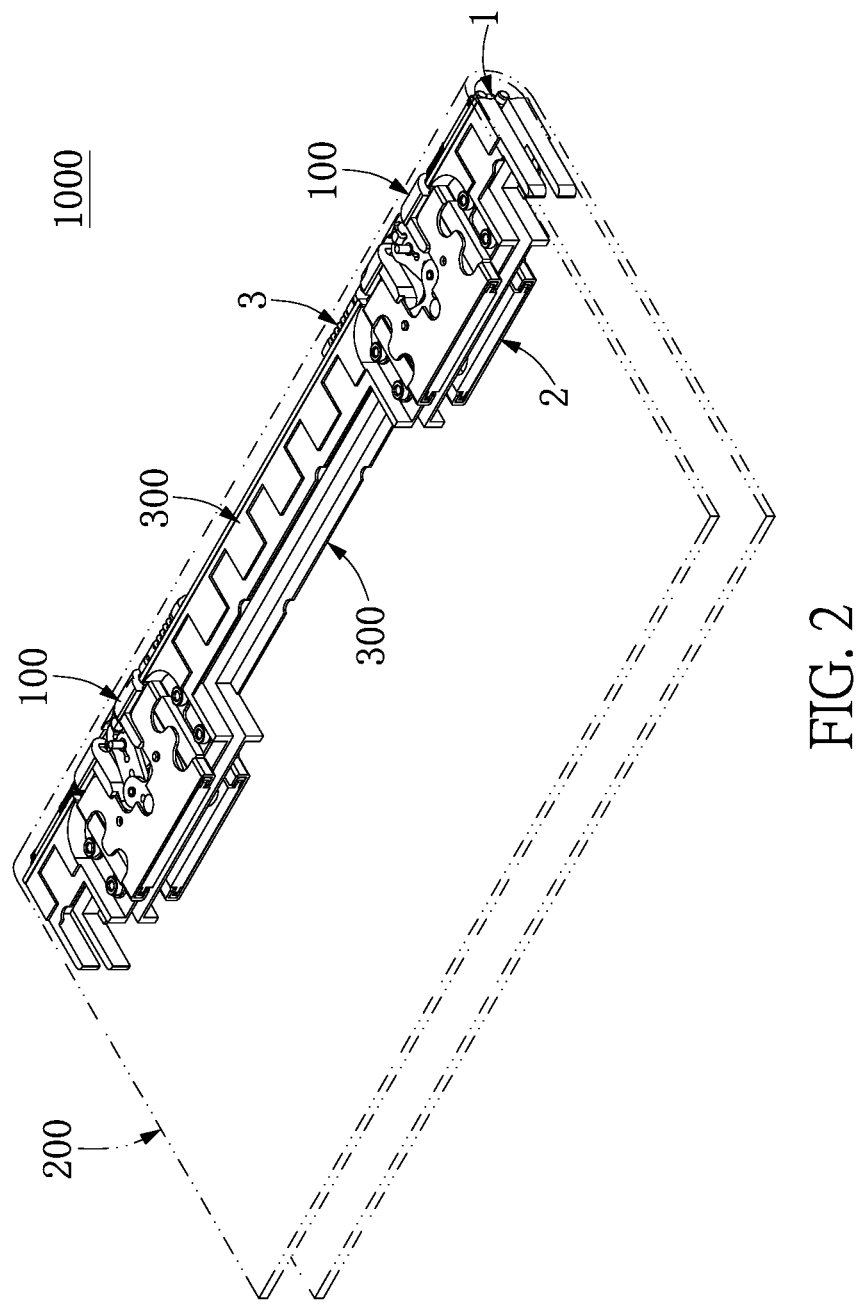
FIG. 2 is a perspective view showing the bendable display apparatus being bent outwardly at 180 degrees.
Figure 3:
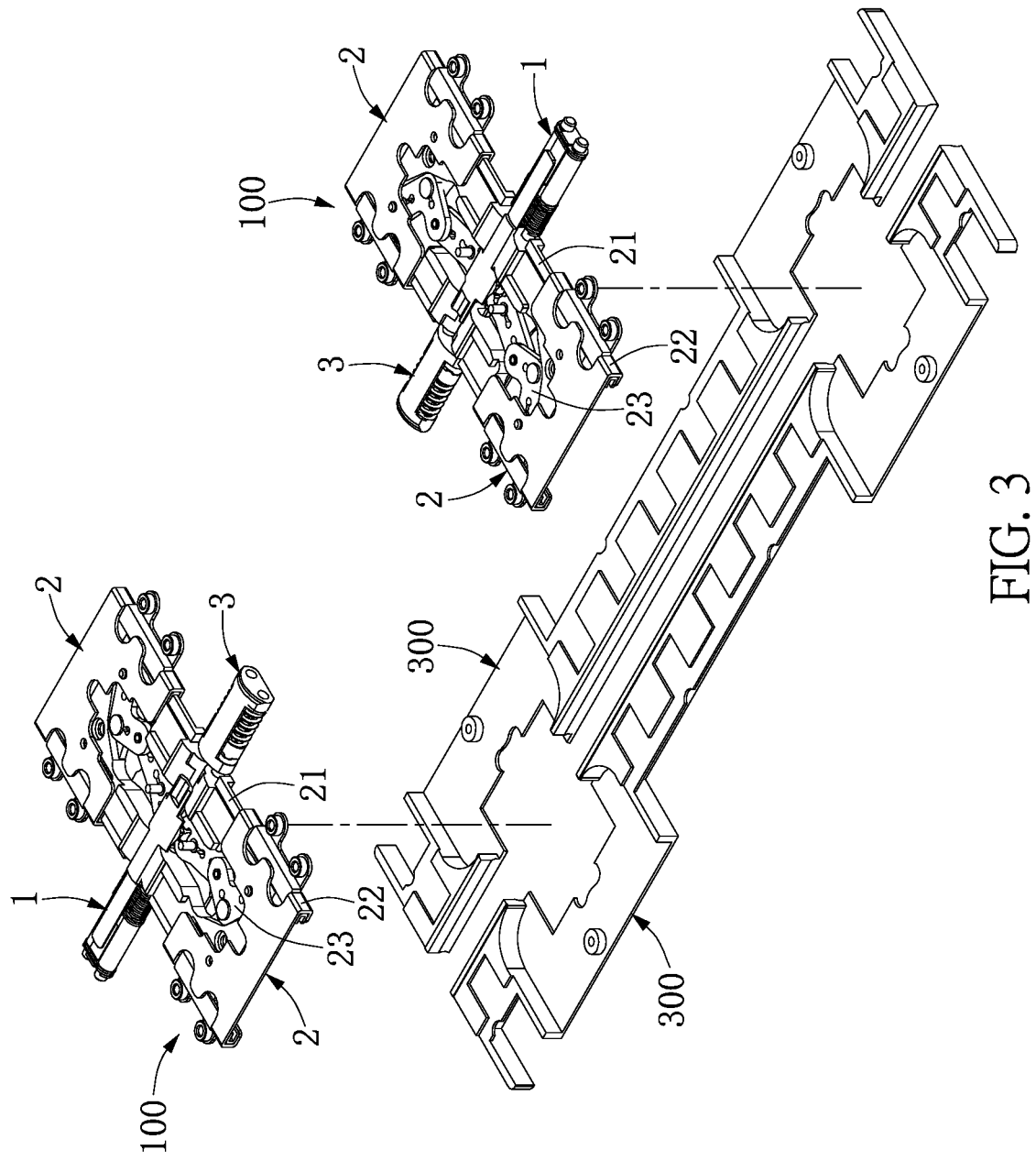
FIG. 3 is an exploded view of FIG. 1 with a bendable display omitted.

Reference is first made to FIGS. 1 to 3, which illustrate a bendable display apparatus 1000 according to an embodiment of the present disclosure. The bendable display apparatus 1000 includes two supporting devices 100, a bendable display 200 mounted on the two supporting devices 100, and two connecting members 300 fastened to the two supporting devices 100. A portion of the bendable display 200 (i.e., a center portion of the bendable display 200) corresponding in position to the supporting devices 100 can be outwardly bent at 180 degrees (as shown in FIG. 2) without suffering damage, but the present disclosure is not limited thereto. Moreover, the two connecting members 300 are respectively fastened to two opposite portions of each of the two supporting devices 100. For example, as shown in FIG. 3, the left connecting member 300 is fastened to the left portions of the two supporting devices 100.

It should be noted that the movement of the bendable display apparatus 1000 is a relative motion, so that the figures are fixed part of the components for clearly showing the present embodiment. Moreover, the supporting device 100 in the present embodiment is applied to the bendable display apparatus 1000, but the supporting device 100 can be applied to other apparatus.

The following description discloses the structure of each of the components of the bendable display apparatus 1000, and then discloses the related features of the components of the bendable display apparatus 1000. The structures of the two supporting devices 100 in the present embodiment are substantially identical or symmetrical, so the following description discloses just one of the two supporting devices 100 for the sake of brevity.

Figure 4:
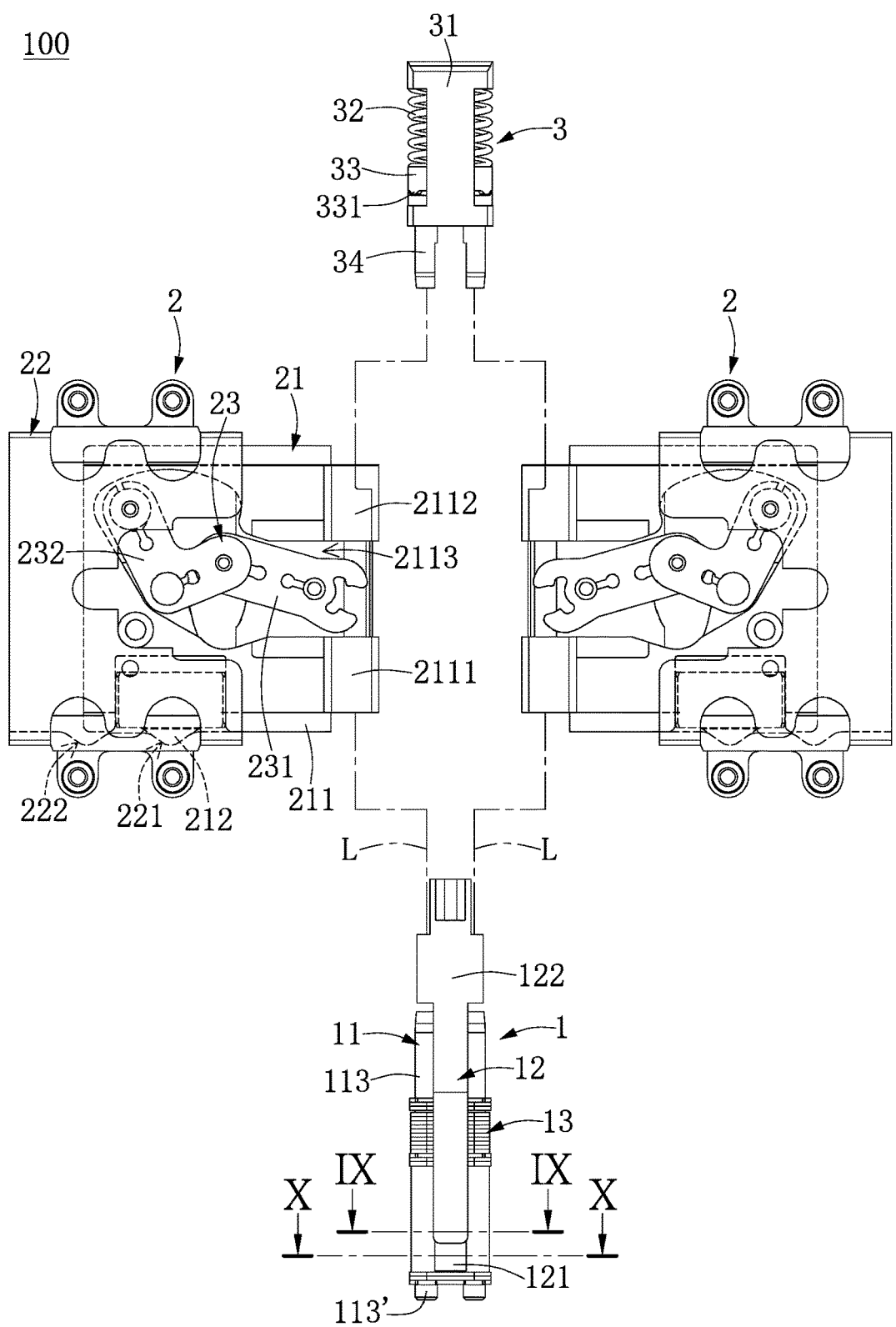
FIG. 4 is an exploded view of a supporting device according to the embodiment of the present disclosure.
Figure 5:
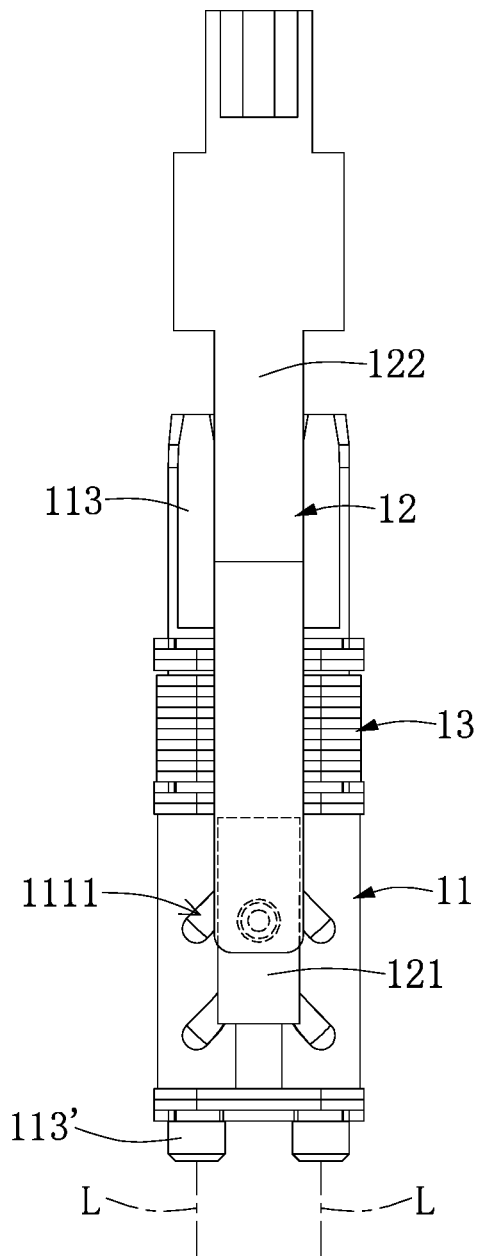
FIG. 5 is a planar view of a dual-shaft driving module being bent outwardly at 180 degrees.

As shown in FIGS. 4 and 5, the supporting device 100 includes a dual-shaft driving module 1 and two buffering modules 2 respectively arranged at two opposite outer sides of the dual-shaft driving module 1. The dual-shaft driving module 1 includes two shafts 11, a synchronizing member 12 sandwiched between the two shafts 11, and two torsion washer assemblies 13 sleeved on the two shafts 11. The following description discloses the structure and connection of the components of the dual-shaft driving module 1.

Figure 6:
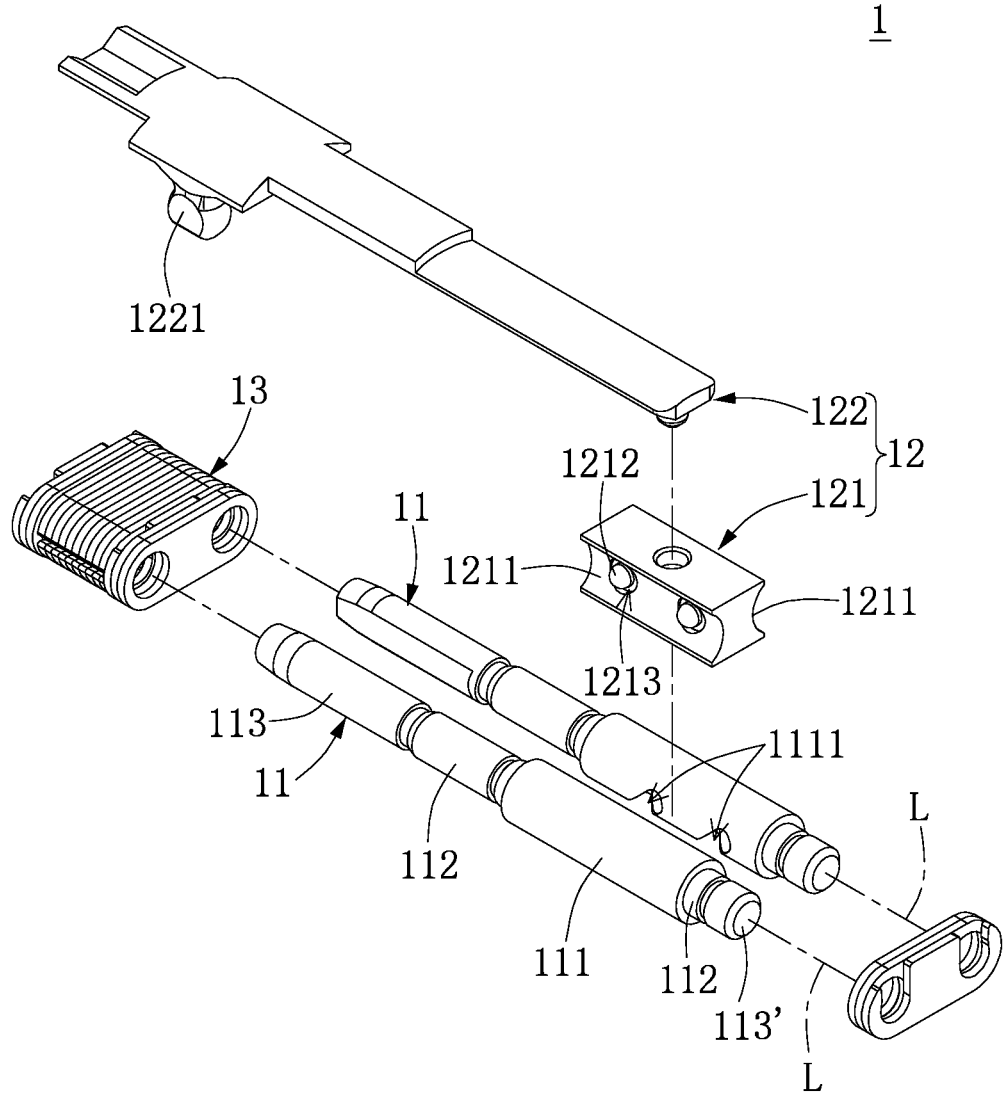
FIG. 6 is an exploded view of the dual-shaft driving module of FIG. 4.
Figure 7:
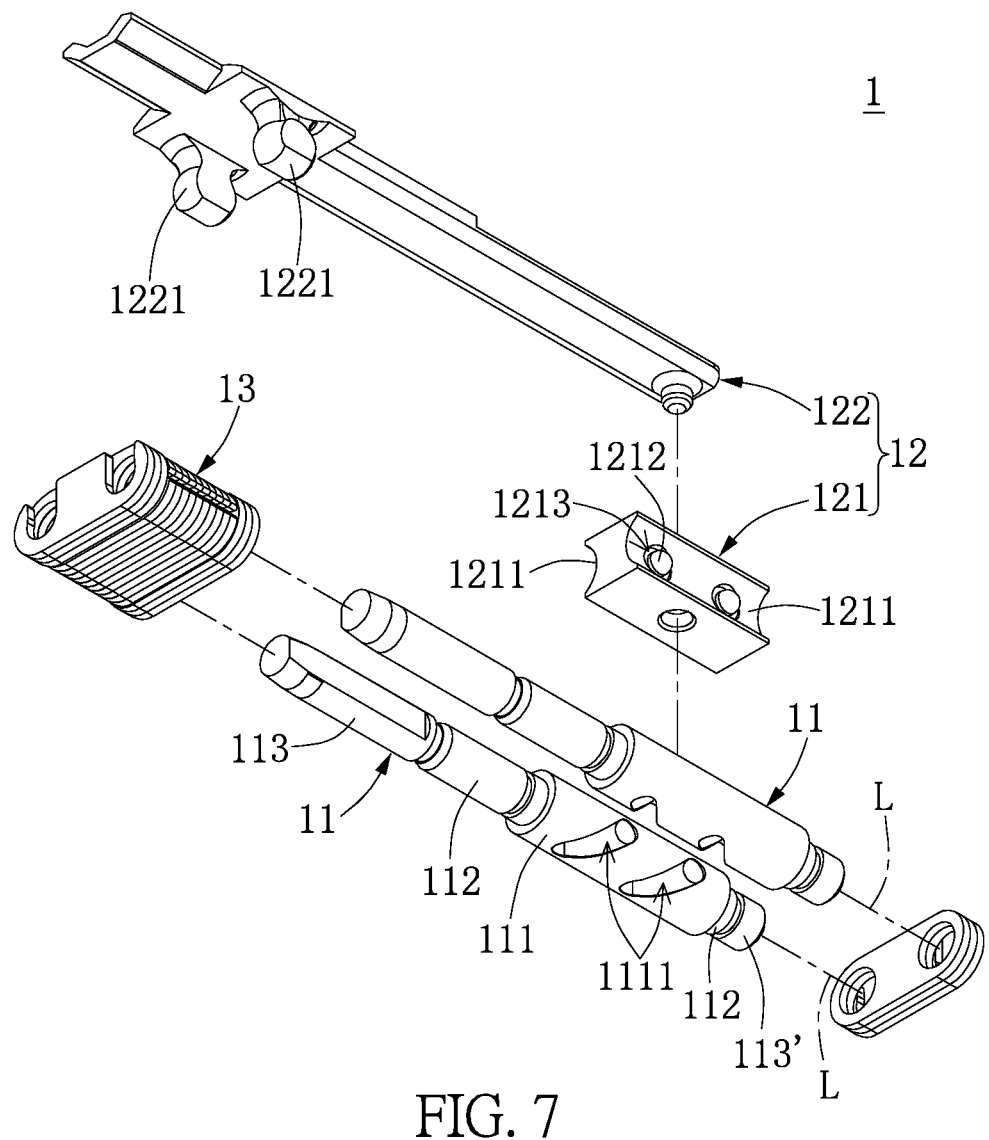
FIG. 7 is an exploded view of the dual-shaft driving module of FIG. 4 from another perspective.

As shown in FIGS. 6 and 7, the two shafts 11 are substantially parallel to each other, that is to say, a central axis L of one of the two shafts 11 is parallel to a central axis L of the other shaft 11. As the two shafts 11 in the present embodiment are in a mirror symmetrical arrangement, the following description discloses the structure of one of the two shafts 11 for the sake of brevity.

The shaft 11 includes a driving segment 111, two extension segments 112 respectively arranged at two opposite outer sides of the driving segment 111 (i.e., the left side and the right side of the driving segment 111 as shown in FIG. 6), two end segments 113, 113' respectively arranged at two opposite outer sides of the two extension segments 112 (i.e., the left side and the right side of the two extension segments 112 as shown in FIG. 6). The driving segment 111 is substantially in a cylindrical structure, and a maximum outer diameter of the driving segment 111 is a maximum outer diameter of the shaft 11.

Figure 8:
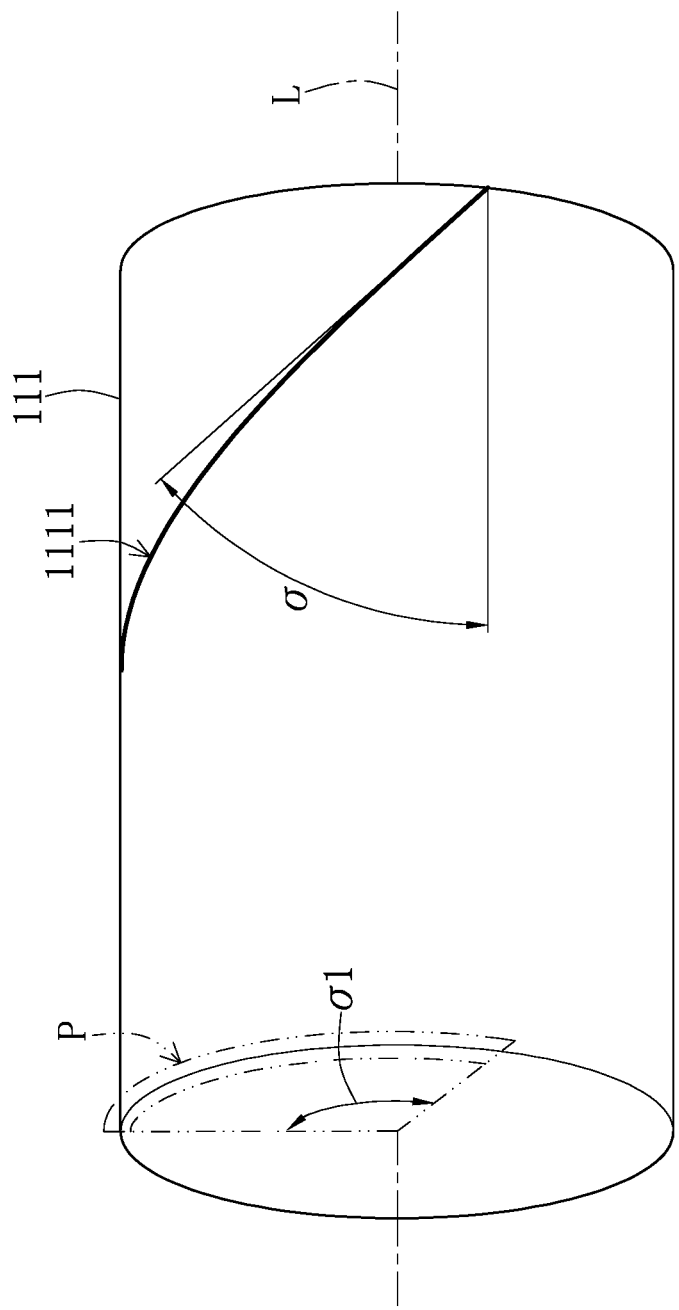
FIG. 8 is a schematic view showing a driving segment of a shaft of FIG. 6.
Figure 9:
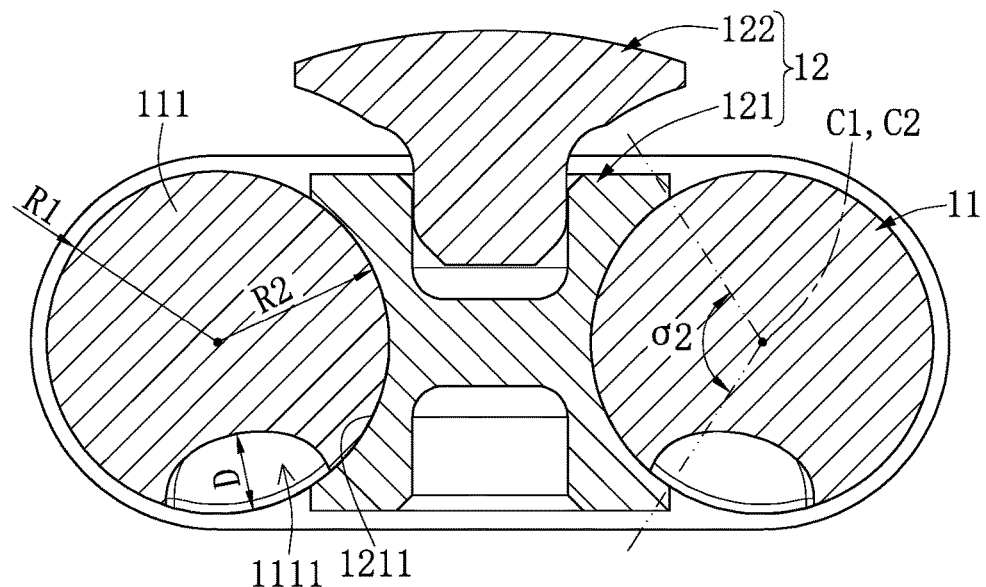
FIG. 9 is a cross-sectional view taken along a cross-sectional line IX-IX of FIG. 4.

The shaft 11 has two spiral grooves 1111 parallel to each other and recessed on an outer surface of the driving segment 111. Each of the spiral grooves 1111 has a spiral angle σ (as shown in FIG. 8) within a range of 40 degrees to 60 degrees. The spiral angle σ in the present embodiment is 45 degrees, but the present disclosure is not limited thereto. A depth D of each of the spiral grooves 1111 (as shown in FIG. 9) is 1/5~1/7 of the maximum outer diameter of the driving segment 111, and the depth D of each of the spiral grooves 1111 in the present embodiment is 1/6 of the maximum outer diameter of the driving segment 111. Moreover, a projecting region P (as shown in FIG. 8), which is defined by orthogonally projecting each of the spiral grooves 1111 onto a plane in a longitudinal direction of the shaft 11 (i.e., the central axis L of the shaft 11), is in an arc shape and has a central angle a1 less than or equal to 90 degrees. The central angle σ1 in the present embodiment is 90 degrees, but the present disclosure is not limited thereto.

Each of the extension segments 112 in the present embodiment is substantially in a cylindrical structure and has an outer diameter smaller than the maximum outer diameter of the driving segment 111. Moreover, one of the two end segments 113, 113' (i.e., the end segment 113) has a non-circle cross section for inserting into and fixing on the corresponding buffering module 2.

The following description discloses the connection between the two shafts 11 and the other components. The two extension segments 112 of each of the two shafts 11 are respectively inserted into the two torsion washer assemblies 13, and the two torsion washer assemblies 13 are respectively arranged at two opposite outer sides of the two driving segments 111. That is to say, each of the two torsion washer assemblies 13 is sleeved on the two adjacent extension segments 112 arranged on the same side of the two shafts 11, and the friction between the two torsion washer assemblies 13 and the extension segments 112 can provide torsion to the dual-shaft driving module 1. The relative position of the two shafts 11 can be effectively maintained by the two torsion washer assemblies 13.

Moreover, the two buffering modules 2 are respectively fastened to the two end segments 113 arranged on one side of the two shafts 11 (i.e., the left side of the two shafts 11 as shown in FIG. 6), and the other two end segments 113' arranged on the other side of the two shafts 11 (i.e., the right side of the two shafts 11 as shown in FIG. 6) are suspended.

As shown in FIGS. 6 and 7, the synchronizing member 12 includes a synchronizing block 121 and a synchronizing shaft 122 connected to the synchronizing block 121. An end portion of the synchronizing shaft 122 is fixed to the synchronizing block 121, and the other end portion of the synchronizing shaft 122 has two protrusions 1221 respectively configured to drive the two buffering modules 2. It should be noted that the synchronizing block 121 and the synchronizing shaft 122 can be integrally formed as a one-piece structure or can be detachably installed with each other, but the present disclosure is not limited thereto.

Moreover, the synchronizing block 121 includes two concave surfaces 1211 arranged on two opposite sides thereof (i.e., the front side and the rear side of the synchronizing block 121 as shown in FIG. 6), four driving portions 1212 respectively protruding from bottoms of the two concave surfaces 1211, and four annular concavities 1213 respectively recessed on the two concave surfaces 1211 and respectively arranged around the four driving portions 1212. The four driving portions 1212 of the synchronizing block 121 in the present embodiment are substantially in a mirror symmetrical arrangement, but the present disclosure is not limited thereto.

Specifically, the synchronizing block 121 is sandwiched between the two shafts 11, and the two concave surfaces 1211 respectively face the two driving segments 111 of the two shafts 11. Each of the two concave surfaces 1211 accommodates a part of the corresponding shaft 11, and the four driving portions 1212 formed on the two concave surfaces 1211 are respectively inserted into the four spiral grooves 1111 of the two shafts 11.

Moreover, in order to improve the stability of the connection between the two shafts 11 and the synchronizing block 121, the present embodiment provides the following structural design of the two shafts 11 and the synchronizing block 121.

Figure 10:
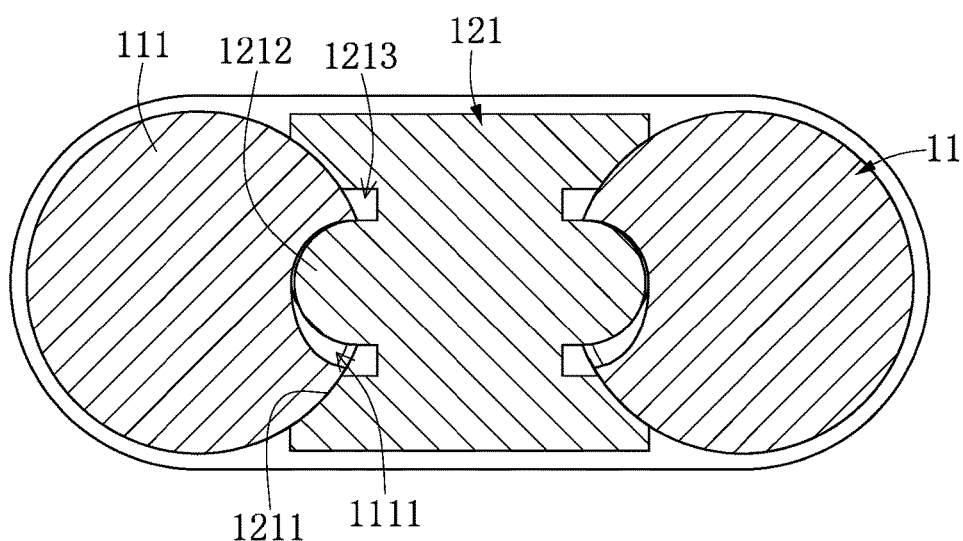
FIG. 10 is a cross-sectional view taken along a cross-sectional line X-X of FIG. 4.

Specifically, in a cross section of the two shafts 11 and the synchronizing block 121 (as shown in FIG. 9 or FIG. 10, which is perpendicular to the central axis L of each of the two shafts 11), each of the two driving segments 111 is substantially in a circle shape and each of the two concave surfaces 1211 is substantially in an arc shape, two circle centers C2 of the two concave surfaces 1211 are respectively arranged at two circle centers C1 of the two driving segments 111, and a radius R2 of each of the two concave surfaces 1211 is substantially equal to a radius R1 of the corresponding driving segment 111. Moreover, a central angle σ2 of each of the two concave surfaces 1211 is preferably within a range of 80 degrees to 110 degrees (i.e., the central angle σ2 is 95 degrees in the present embodiment), but the present disclosure is not limited thereto.

In addition, the number of the spiral grooves 1111 of the shaft 11 in the present embodiment is two, and the number of the driving portions 1212 of the synchronizing block 121 in the present embodiment is four, but the present disclosure is not limited thereto. In other embodiments of the present disclosure, the number of the spiral grooves 1111 of the shaft 11 can be one, the number of the driving portions 1212 of the synchronizing block 121 can be two, and the two driving portions 1212 of the synchronizing block 121 respectively couple with the spiral grooves 1111 of the two shafts 11.

The structure of the dual-shaft driving module 1 has been disclosed in the above description, and the following description discloses the operation of the dual-shaft driving module 1. When one of the two shafts 11 is spun to transmit a force to the synchronizing block 121, the synchronizing block 121 rotates the other shaft 11 at the same time by the force. Specifically, when one of the two shafts 11 is spun (e.g., the left shaft 11 as shown in FIG. 6), the two spiral grooves 1111 of the spun shaft 11 respectively drive the corresponding two driving portions 1212 (e.g., the left two driving portions 1212 as shown in FIG. 6) to move therein, so that the other two driving portions 1212 (e.g., the right two driving portions 1212 as shown in FIG. 6) are moved to respectively press the corresponding two spiral grooves 1111 for rotating the other shaft 11 (e.g., the right shaft 11 as shown in FIG. 6) at the same time. Moreover, when the two shafts 11 are spun, the synchronizing block 121 moves straightly in a direction parallel to the central axis L of each of the two shafts 11 (as shown in FIGS. 4 and 5).

As shown in FIGS. 4 and 11-13, the two buffering modules 2 are respectively fastened to the two end segments 113 of the two shafts 11. Each of the two buffering modules 2 includes an internal connecting member 21 fixed on the end segment 113 of the corresponding shaft 11, an external connecting member 22 slidably disposed on the internal connecting member 21, and a linkage mechanism 23 pivotally connecting to the internal connecting member 21 and configured to be driven by the corresponding protrusion 1221 of the synchronizing shaft 122 for moving the external connecting member 22 relative to the internal connecting member 21. In other words, the two protrusions 1221 of the synchronizing shaft 122 can respectively drive the two linkage mechanisms 23 of the two buffering modules 2. The structures of the two buffering modules 2 in the present embodiment are substantially identical or symmetrical, so the following description only illustrates one of the two buffering modules 2 for the sake of brevity.

Figure 11:
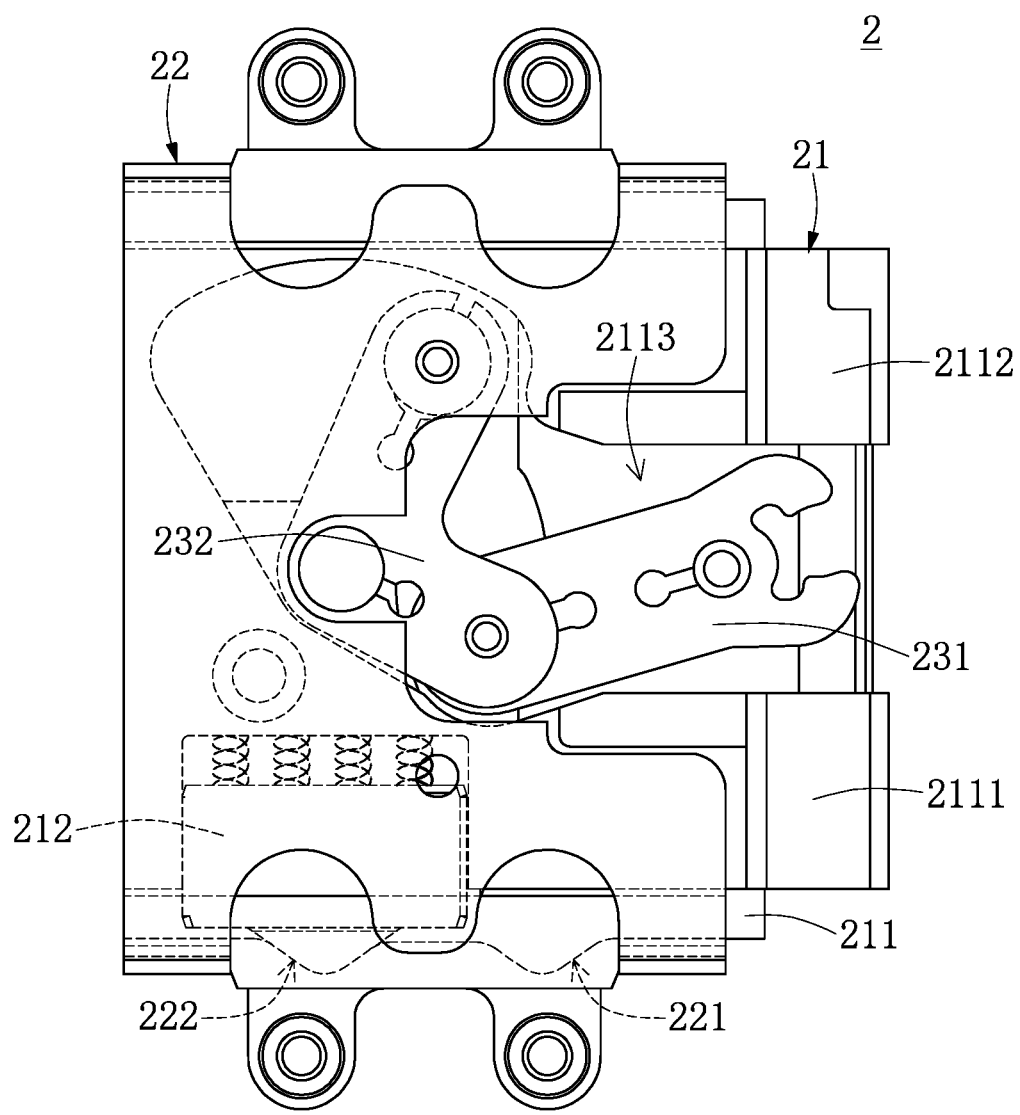
FIG. 11 is a planar view of a buffering module when the dual-shaft driving module is bent outwardly at 180 degrees.

It should be noted that the dual-shaft driving module 1 is bendable between an unfolded position (as shown in FIG. 4) and an outwardly folded position (as shown in FIG. 11). When the dual-shaft driving module 1 is at the unfolded position, the supporting device 100 is a flat structure. When the dual-shaft driving module 1 is at the outwardly folded position, the supporting device 100 is a curved structure, and the internal members 21 of the two buffering modules 2 are arranged inside the supporting device 100.

Figure 12:
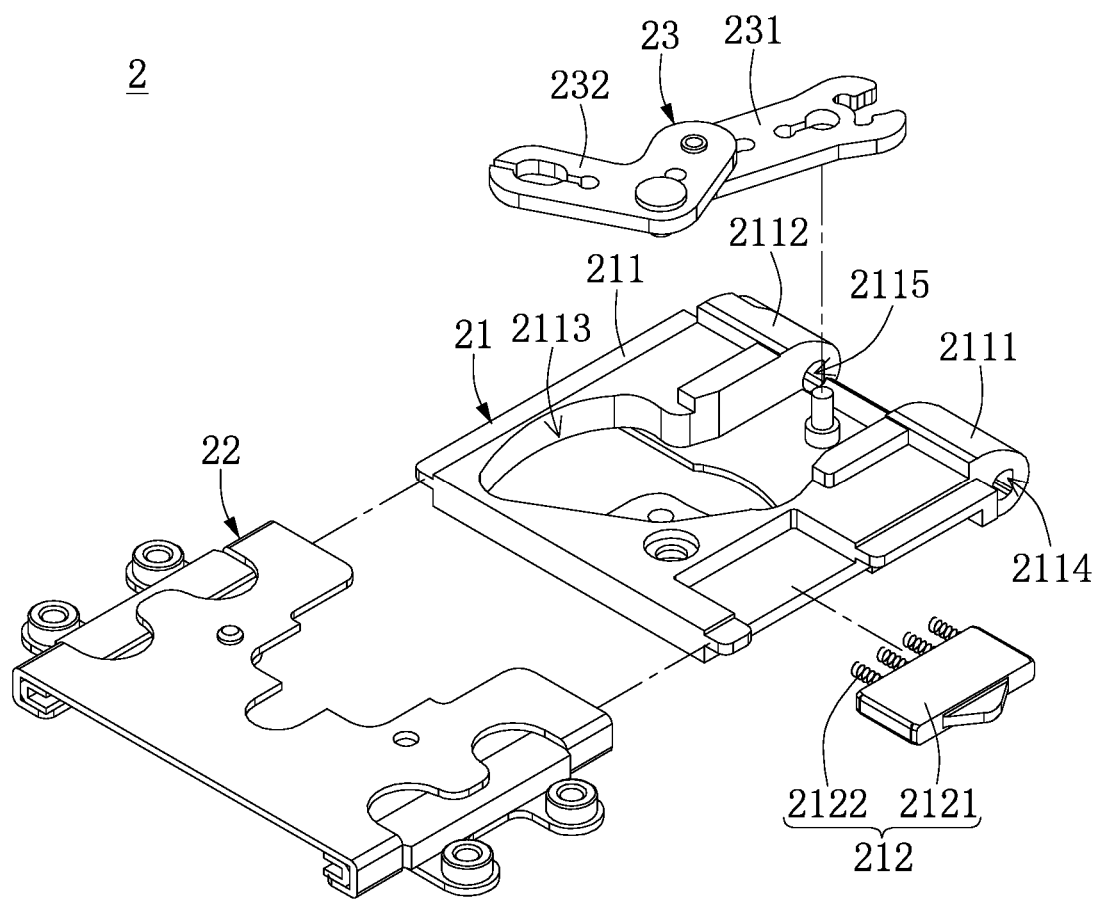
FIG. 12 is an exploded view of the buffering module of FIG. 4.
Figure 13:
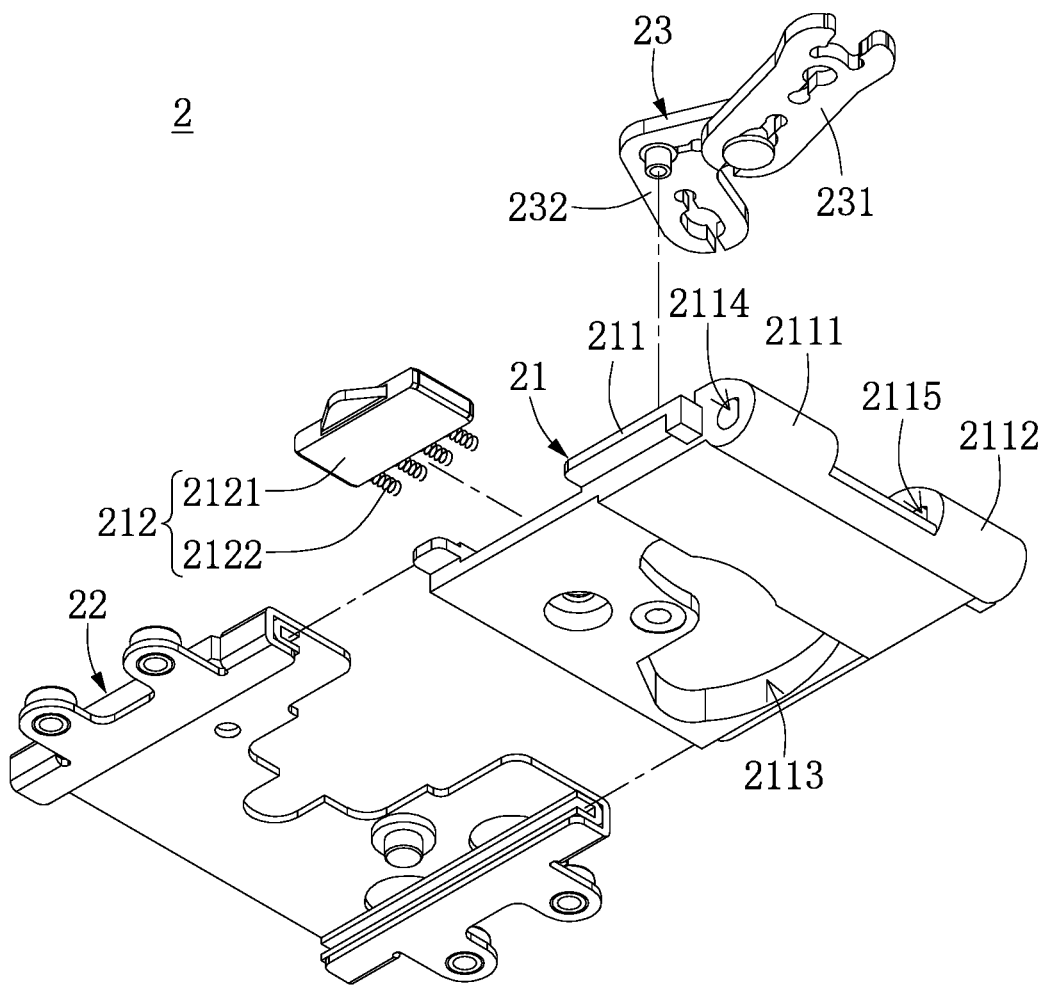
FIG. 13 is an exploded view of the buffering module of FIG. 4 from another perspective.

As shown in FIGS. 4, 12, and 13, the internal connecting member 21 is substantially a flat structure and is fixed to the connecting member 300. The internal connecting member 21 includes a plate 211 and a positioning structure 212 disposed on the plate 211 and elastically movable relative to the plate 211. A part of the positioning structure 212 protrudes from the edge of the plate 211 (i.e., a bottom edge of the plate 212 substantially perpendicular to the shaft 11 as shown in FIG. 4). In the present embodiment, the positioning structure 212 includes an abutting block 2121 and a plurality of elastic members 2122 (i.e., springs) connected to the abutting block 2121, but the present disclosure is not limited thereto.

The plate 211 has a first fixing portion 2111, a second fixing portion 2112 arranged at a distance to the first fixing portion 2111, and an accommodating slot 2113. Specifically, the first fixing portion 2111 and the second fixing portion 2112 are arranged on one side of the plate 211 (i.e., the right side of the plate 211 as shown in FIG. 12) adjacent to the dual-shaft driving module 1 and the positioning module 3. The first fixing portion 2111 has a first thru-hole 2114 having a non-circle cross section for providing the insertion of the end segment 113 of the corresponding shaft 11. The second fixing portion 2112 has a second thru-hole 2114 having a non-circle cross section for fixing to the positioning module 3.

The accommodating slot 2113 is recessed from a portion of the plate 211 between the first fixing portion 2111 and the second fixing portion 2112 in a direction (i.e., to the left as shown in FIG. 12) away from the dual-shaft driving module 1. The accommodating slot 2113 is formed to accommodate the linkage mechanism 23 and provide a space for the movement of the linkage mechanism 23. Moreover, the corresponding protrusion 1221 of the synchronizing shaft 122 is movably arranged in a part of the accommodating slot 2113 between the first fixing portion 2111 and the second fixing portion 2112.

As shown in FIGS. 4, 11, 12, and 13, the external connecting member 22 is substantially a flat structure and is slidably sleeved at two opposite edges of the plate 211 of the internal connecting member 21 (i.e., a top edge and a bottom edge of the plate 212 substantially perpendicular to the shaft 11 as shown in FIG. 4). A portion of the external connecting member 22 substantially facing the positioning structure 212 has a first limiting slot 221 and a second limiting slot 222 spaced apart from the first limiting slot 221. A distance between the first limiting slot 221 and the adjacent shaft 11 is smaller than a distance between the second limiting slot 222 and the adjacent shaft 11.

Moreover, the positioning structure 212 of the internal connecting member 21 is selectively engaged in the first limiting slot 221 and the second limiting slot 222. Specifically, when the dual-shaft driving module 1 is at the unfolded position (as shown in FIG. 4), the positioning structure 212 of the internal connecting member 21 is engaged in the first limiting slot 221. When the dual-shaft driving module 1 is at the outwardly folded position (as shown in FIG. 11), the positioning structure 212 of the internal connecting member 21 is engaged in the second limiting slot 222.

As shown in FIGS. 4, 12, and 13, the linkage mechanism 23 includes a first link lever 231 and a second link lever 232 both pivotally connected to the internal connecting member 21. The first link lever 231 in the present embodiment is an elongated structure, and a pivoting portion of the first link lever 231 between two opposite ends thereof is pivotally connected to the plate 211 of the internal connecting member 21, so that the first link lever 231 is rotatable along the pivoting portion relative to the plate 211 of the internal connecting member 21. The second link lever 232 in the present embodiment is an L-shaped structure, and a corner portion of the second link lever 232 is pivotally connected to the plate 211 of the internal connecting member 21, so that the second link lever 232 is rotatable along the corner portion relative to the plate 211 of the internal connecting member 21.

Moreover, an end of the first link lever 231 is pivotally connected to an end of the second link lever 232 (i.e., the left end of the first link lever 231 is pivotally connected to the right end of the second link lever 232 as shown in FIG. 12), the other end of the first link lever 231 is connected to the corresponding synchronizing shaft 122 (i.e., the right end of the first link lever 231 having a clip shape clamping the corresponding protrusion 1221 of the synchronizing shaft 122 as shown in FIG. 12), and the other end of the second link lever 232 is connected to the external connecting member 22 (i.e., the left end of the second link lever 232 is pivotally connected to the external connecting member 22 as shown in FIG. 12).

Thus, when the first link lever 231 is driven by the corresponding protrusion 1221 of the synchronizing shaft 122, the first link lever 231 and the second link lever 232 are rotated relative to the plate 211 of the internal connecting member 21, and the rotation of the second link lever 232 moves the external connecting member 22 relative to the internal connecting member 21.

Figure 14:
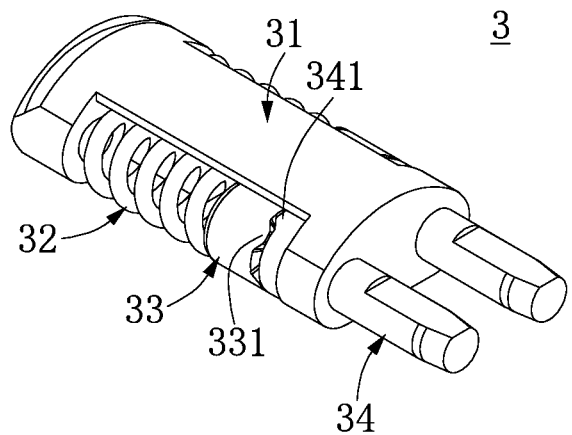
FIG. 14 is a perspective view of a positioning module when the dual-shaft driving module is bent outwardly at 180 degrees.
Figure 15:
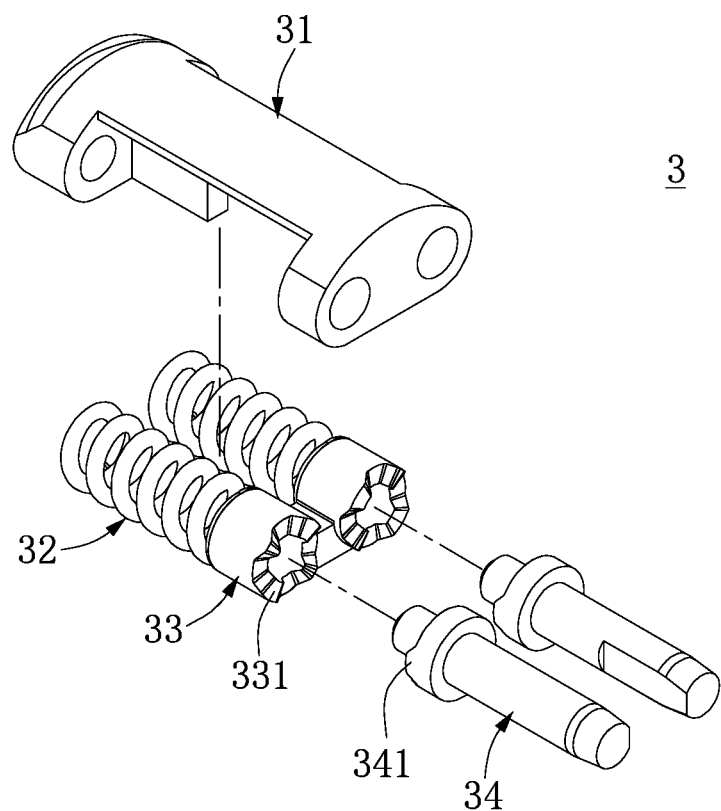
FIG. 15 is an exploded view of the positioning module of FIG. 4.

As shown in FIGS. 4, 14, and 15, the positioning module 3 is fixed to the internal connecting members 21 of the two buffering modules 2. The positioning module 3 is configured to provide a torsion force for enabling the dual-shaft driving module 1 tending to move toward the unfolded position or the outwardly folded position. In the present embodiment, the positioning module 3 includes a housing 31, two springs 32 and a fixing cam 33 arranged in the housing 31, and two rotating rods 34 respectively and rotatably cooperated with the fixing cam 33.

Specifically, an end of the two springs 32 (i.e., the top ends of the springs 32 as shown in FIG. 4) is fixed on the housing 31, the other end of the two springs 32 (i.e., the bottom ends of the springs 32 as shown in FIG. 4) is fixed on an end of the fixing cam 33 (i.e., the top end of the fixing cam 33 as shown in FIG. 4), and the fixing cam 33 has two teeth portions 331 formed on the other end thereof (i.e., the bottom end of the fixing cam 33 as shown in FIG. 4).

Moreover, an end of the two rotating rods 34 (i.e., the left end of the rotating rods 34 as shown in FIG. 15) has two cam portions 341 arranged in the housing 31 and respectively cooperated with the two teeth portions 331, and the other end of the two rotating rods 34 (i.e., the bottom end of the rotating rods 34 as shown in FIG. 4) is fixed to the second fixing portions 2112 of the two corresponding internal connecting members 21. The two central axes L of the two shafts 11 respectively overlap that of the two rotating rods 34.

Thus, when the dual-shaft driving module 1 is rotated and is not at the unfolded position and the outwardly folded position, the two cam portions 341 of the two rotating rods 34 respectively press and move the two teeth portions 331 of the fixing cam 33 (i.e., the cam portion 341 abuts against a slanting surface of the teeth portion 331), so that the fixing cam 33 presses the two springs 32 to generate the torsion force for enabling the two cam portions 341 of the two rotating rods 34 tending to move away from the two teeth portions 331 (i.e., the two cam portions 341 of the two rotating rods 34 tend to move toward the slots each formed on any two tooth of the teeth portion 331 as shown in FIG. 15). In other words, the positioning module 3 can move the dual-shaft driving module 1 toward the unfolded position and the outwardly folded position.

The structure and connection of the supporting device 100 in the present embodiment have been disclosed in the above description, and the following description discloses the operation of the bendable display apparatus 1000. Specifically, when the dual-shaft driving modules 1 of the bendable display apparatus 1000 are rotated from the unfolded position (as shown in FIG. 1) to the outwardly folded position (as shown in FIG. 2) at the same time, the bendable display 200 is bent while a length of the bendable display 200 remains constant, and the external connecting member 22 of each of the buffering modules 2 is moved toward the corresponding synchronizing member 12 with respect to the internal connecting member 21.

In summary, for the bendable display apparatus 1000 of the present embodiment, when the dual-shaft driving module 1 is bent between the unfolded position and the outwardly folded position, the external connecting member 22 is moved relative to the internal connecting member 21, so that the supporting device 100 does not stretch the bendable display 200. Thus, when the two supporting devices 100 support the bendable display 200, the bendable display 200 can be bent without suffering damage.

Moreover, the dual-shaft driving module 1 of each of the two supporting devices 100 cannot be bent from the unfolded position toward a position away from the outwardly folded position by the structural design of each of the two supporting devices 100 (i.e., the positioning module 3 or the cooperation of the positioning structure 212 and the first and second limiting slots 221, 222), so that the damage caused by inwardly bending the bendable display 200 can be avoided.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A bendable display apparatus, comprising:
   two supporting devices each including:
      a dual-shaft driving module including:
         two shafts substantially parallel to each other, wherein each of the two shafts has a spiral groove recessed on an outer surface thereof and having a spiral angle within a range of 40 degrees to 60 degrees; and
         a synchronizing member including a synchronizing block sandwiched between the two shafts and a synchronizing shaft connected to the synchronizing block, wherein the synchronizing block includes two driving portions respectively protruding from two opposite side surfaces thereof and respectively coupling with the spiral grooves of the two shafts,
         wherein when one of the two shafts is spun to transmit a force to the synchronizing block, the synchronizing block rotates the other shaft at the same time by the force; and
      two buffering modules respectively arranged at two opposite outer sides of the dual-shaft hinge module and respectively installed to the two shafts, each of the two buffering modules including:
         an internal connecting member fixed on the corresponding shaft;
         an external connecting member slidably disposed on the internal connecting member; and
         a linkage mechanism pivotally connecting to the internal connecting member, wherein the linkage mechanism is configured to be driven by the synchronizing shaft for moving the external connecting member relative to the internal connecting member;
      wherein in each of the two supporting devices, the dual-shaft driving module is bendable between an unfolded position and an outwardly folded position; when the dual-shaft driving module is at the unfolded position, the supporting device is a flat structure; when the dual-shaft driving module is at the outwardly folded position, the supporting device is a curved structure and the internal members of the two buffering modules are arranged inside the supporting device;
   a bendable display mounted on the two supporting devices, wherein when the dual-shaft driving module of each of the two supporting devices is rotated from the unfolded position to the outwardly folded position, the bendable display is bent while a length of the bendable display remains constant, and the external connecting member of each of the buffering modules is moved toward the corresponding synchronizing member with respect to the internal connecting member.

2. The bendable display apparatus as claimed in claim 1, wherein in the dual-shaft driving module of each of the two supporting devices, an end portion of the synchronizing shaft is fixed to the synchronizing block, and the other end portion of the synchronizing shaft has two protrusions respectively configured to drive the linkage mechanisms of the two buffering modules.

3. The bendable display apparatus as claimed in claim 1, wherein in each of the buffering modules, the linkage mechanism includes a first link lever and a second link lever both pivotally connected to the internal connecting member, an end of the first link lever is pivotally connected to an end of the second link lever, the other end of the first link lever is connected to the corresponding synchronizing shaft, and the other end of the second link lever is connected to the external connecting member; when the first link lever is driven by the corresponding synchronizing shaft, the first link lever and the second link lever are rotated relative to the internal connecting member, and the rotation of the second link lever moves the external connecting member relative to the internal connecting member.

4. The bendable display apparatus as claimed in claim 3, wherein in each of the buffering modules, the internal connecting member has an accommodating slot, and the linkage mechanism is arranged in the accommodating slot.

5. The bendable display apparatus as claimed in claim 1, wherein in each of the buffering modules, the external connecting member has a first limiting slot and a second limiting slot, and the internal connecting member includes a positioning structure selectively engaged in the first limiting slot and the second limiting slot.

6. The bendable display apparatus as claimed in claim 1, wherein in the dual-shaft driving module of each of the two supporting devices, each of the two shafts includes a driving segment, two extension segments respectively arranged at two opposite sides of the driving segment, and two end segments respectively arranged at two opposite outer sides of the two extension segments; in each of the shafts, a depth of the spiral groove is $1/5$-$1/7$ of a maximum outer diameter of the driving segment, a projecting region defined by orthogonally projecting the spiral groove onto a plane in a longitudinal direction of the corresponding shaft is in an arc shape and has a central angle less than or equal to 90 degrees.

7. The bendable display apparatus as claimed in claim 6, wherein in the dual-shaft driving module of each of the two supporting devices, the two side surfaces of the synchronizing block are two concave surfaces, and the two driving portions respectively protrude from bottoms of the two concave surfaces; in a cross section of the two shafts and the synchronizing block of each of the dual-shaft driving modules, each of the two driving segments is substantially in a circle shape, each of the two concave surfaces is substantially in an arc shape, and two circle centers of the two concave surfaces are respectively arranged at two circle centers of the two driving segments.

8. The bendable display apparatus as claimed in claim 1, wherein each of the two supporting devices includes a positioning module; in each of the two supporting devices, the positioning module is fixed to the internal connecting members of the two buffering modules, and the positioning module is configured to provide a torsion force for enabling the dual-shaft driving module tending to move toward the unfolded position or the outwardly folded position.

9. The bendable display apparatus as claimed in claim 8, wherein the positioning module of each of the two supporting devices includes a housing, two springs and a fixing cam arranged in the housing, and two rotating rods respectively and rotatably cooperated with the fixing cam; in the positioning module of each of the two supporting devices, an end of the two springs is fixed on the housing, the other end of the two springs is fixed on an end of the fixing cam, the fixing cam has two teeth portions formed on the other end thereof, an end of the two rotating rods has two cam portions respectively cooperated with the two teeth portions, and the other end of the two rotating rods is fixed to the two corresponding internal connecting members; in each of the two supporting devices, two central axes of the two shafts respectively overlap that of the two rotating rods.

10. A supporting device, comprising:
   a dual-shaft driving module including:
      two shafts substantially parallel to each other, wherein each of the two shafts has a spiral groove recessed on an outer surface thereof and having a spiral angle within a range of 40 degrees to 60 degrees; and
      a synchronizing member including a synchronizing block sandwiched between the two shafts and a synchronizing shaft connected to the synchronizing block, wherein the synchronizing block includes two driving portions respectively protruding from two opposite side surfaces thereof and respectively coupling with the spiral grooves of the two shafts,
      wherein when one of the two shafts is spun to transmit a force to the synchronizing block, the synchronizing block rotates the other shaft at the same time by the force; and
   two buffering modules respectively arranged at two opposite outer sides of the dual-shaft hinge module and respectively installed to the two shafts, each of the two buffering modules including:
      an internal connecting member fixed on the corresponding shaft;
      an external connecting member slidably disposed on the internal connecting member; and
      a linkage mechanism pivotally connecting to the internal connecting member, wherein the linkage mechanism is configured to be driven by the synchronizing shaft for moving the external connecting member relative to the internal connecting member;
   wherein the dual-shaft driving module is bendable between an unfolded position and an outwardly folded position; when the dual-shaft driving module is bent from the unfolded position toward the outwardly folded position, the supporting device is changed from a flat structure to a curved structure, the internal members of the two buffering modules are arranged inside the supporting device, and the external connecting member of each of the two buffering modules is moved toward the synchronizing member with respect to the corresponding internal connecting member.

11. The supporting device as claimed in claim 10, wherein in the dual-shaft driving module, an end portion of the synchronizing shaft is fixed to the synchronizing block, and the other end portion of the synchronizing shaft has two protrusions respectively configured to drive the linkage mechanisms of the two buffering modules.

12. The supporting device as claimed in claim 10, wherein in each of the buffering modules, the linkage mechanism includes a first link lever and a second link lever both pivotally connected to the internal connecting member, an end of the first link lever is pivotally connected to an end of the second link lever, the other end of the first link lever is connected to the synchronizing shaft, and the other end of the second link lever is connected to the external connecting member; when the first link lever is driven by the synchronizing shaft, the first link lever and the second link lever are rotated relative to the internal connecting member, and the rotation of the second link lever moves the external connecting member relative to the internal connecting member.

13. The supporting device as claimed in claim 12, wherein in each of the buffering modules, the internal connecting member has an accommodating slot, and the linkage mechanism is arranged in the accommodating slot.

14. The supporting device as claimed in claim 10, wherein in each of the buffering modules, the external connecting member has a first limiting slot and a second limiting slot, and the internal connecting member includes a positioning structure selectively engaged in the first limiting slot and the second limiting slot.

15. The supporting device as claimed in claim 10, wherein in the dual-shaft driving module, each of the two shafts includes a driving segment, two extension segments respectively arranged at two opposite sides of the driving segment, and two end segments respectively arranged at two opposite outer sides of the two extension segments; in each of the shafts, a depth of the spiral groove is $\frac{1}{5}$-$\frac{1}{7}$ of a maximum outer diameter of the driving segment, a projecting region defined by orthogonally projecting the spiral groove onto a plane in a longitudinal direction of the corresponding shaft is in an arc shape and has a central angle less than or equal to 90 degrees.

16. The supporting device as claimed in claim 15, wherein in the dual-shaft driving module, the two side surfaces of the synchronizing block are two concave surfaces, and the two driving portions respectively protrude from bottoms of the two concave surfaces; in a cross section of the two shafts and the synchronizing block, each of the two driving segments is substantially in a circle shape, each of the two concave surfaces is substantially in an arc shape, and two circle centers of the two concave surfaces are respectively arranged at two circle centers of the two driving segments.

17. The supporting device as claimed in claim 10, further comprising a positioning module fixed to the internal connecting members of the two buffering modules, wherein the positioning module is configured to provide a torsion force for enabling the dual-shaft driving module tending to move toward the unfolded position or the outwardly folded position.

18. The supporting device as claimed in claim 17, wherein the positioning module includes a housing, two springs and a fixing cam arranged in the housing, and two rotating rods respectively and rotatably cooperated with the fixing cam; an end of the two springs is fixed on the housing, the other end of the two springs is fixed on an end of the fixing cam, the fixing cam has two teeth portions formed on the other end thereof, an end of the two rotating rods has two cam portions respectively cooperated with the two teeth portions, and the other end of the two rotating rods is fixed to the two internal connecting members of the two buffering modules; two central axes of the two shafts respectively overlap that of the two rotating rods.

\* \* \* \* \*